(12) United States Patent
Clement et al.

(10) Patent No.: US 11,096,393 B2
(45) Date of Patent: Aug. 24, 2021

(54) BAKERY PRODUCT

(71) Applicant: Generale Biscuit, Clamart (FR)

(72) Inventors: Jerome Clement, Saclay (FR); Edward Coleman, East Hanover, NJ (US)

(73) Assignee: Generale Biscuit, Clamart (FR)

( * ) Notice: Subject to any disclaimer, the term of this patent is extended or adjusted under 35 U.S.C. 154(b) by 506 days.

(21) Appl. No.: 15/556,284

(22) PCT Filed: Mar. 11, 2016

(86) PCT No.: PCT/EP2016/055234
§ 371 (c)(1),
(2) Date: Sep. 6, 2017

(87) PCT Pub. No.: WO2016/146502
PCT Pub. Date: Sep. 22, 2016

(65) Prior Publication Data
US 2018/0035677 A1 Feb. 8, 2018

(30) Foreign Application Priority Data
Mar. 13, 2015 (EP) .................................. 15159038

(51) Int. Cl.
A21D 13/062 (2017.01)
A21D 2/18 (2006.01)
A21D 8/06 (2006.01)

(52) U.S. Cl.
CPC ........... *A21D 13/062* (2013.01); *A21D 2/181* (2013.01); *A21D 8/06* (2013.01); *A23V 2002/00* (2013.01)

(58) Field of Classification Search
None
See application file for complete search history.

(56) References Cited

U.S. PATENT DOCUMENTS

| 3,393,074 A | 7/1968 | Ehrlich |
| 4,350,713 A | 9/1982 | Dyson |
| 6,838,107 B1 * | 1/2005 | Bakal ..................... A23L 29/37 426/549 |

(Continued)

FOREIGN PATENT DOCUMENTS

| CN | 102077949 B | 6/2011 |
| CN | 102934674 A | 2/2013 |

(Continued)

OTHER PUBLICATIONS

Shin et al., "Characteristics of Sugar Cookies with Replacement of Sucrose with Sugar Alcohols"—J. Korean Soc. Food Sci. Nutr., 28(4), 1999, pp. 850-857. (Year: 1999).*

(Continued)

*Primary Examiner* — Elizabeth Gwartney
(74) *Attorney, Agent, or Firm* — Fitch, Even, Tabin & Flannery LLP

(57) ABSTRACT

The present invention relates to a soft bakery product having a slowly-available-glucose (SAG) content of at least 15 wt % and a water activity of from 0.4 to 0.9, the product comprising a dough-based, baked portion and optionally a coating and/or a filling, the product comprising: cereals in an amount of at least 35 wt %; at least 5 wt % sugars, having a degree of polymerisation of 1 or 2, by weight of the soft bakery product; and from 0.1 to 15 wt % maltitol by weight of the soft bakery product.

13 Claims, 1 Drawing Sheet

(56) References Cited

U.S. PATENT DOCUMENTS

| | | | |
|---|---|---|---|
| 2005/0058759 A1 | 3/2005 | Schmidt | |
| 2013/0177676 A1 | 7/2013 | Borges | |
| 2014/0065270 A1* | 3/2014 | Huynh-Ba | A21D 2/245 426/139 |
| 2014/0199461 A1 | 7/2014 | De Baets | |

FOREIGN PATENT DOCUMENTS

| | | |
|---|---|---|
| CN | 102960406 A | 3/2013 |
| CN | 103918763 | 7/2014 |
| EP | 0390299 | 7/2000 |
| EP | 1712134 | 10/2006 |
| KR | 101268374 | 5/2013 |
| WO | 2007095977 | 8/2007 |
| WO | 2012155154 | 11/2012 |
| WO | 2013079084 A1 | 6/2013 |

OTHER PUBLICATIONS

Lelong (EP 1 712 134—Espacenet translation)—Abstract (Year: 2006).*
Lelong (EP 1 712 134—Espacenet translation)—Description str (Year: 2006).*
Lelong (EP 1 712 134—Espacenet translation)—Claims (Year: 2006).*
Hamel, P.J., "Classic Yellow Cake with Chocolate Frosting: Only in America . . . ", King Arthur Flour, https://www.kingarthurflour.com/blog/2011/12/26/classic-yellow-cake-with-chocolate-frosting-only-in-america; Dec. 26, 2011, downloaded Jun. 12, 2020. (Year: 2011).*
Jia et al.,"Sensory and instrumental assessment of Chinese moon cake: Influences of almond flour, maltitol syrup, fat and gums"—Food Research International, 41, (2008), pp. 930-936. (Year: 2008).*
Genyi Zhang et al. "Slowly Digestible Starch: Concept, Mechanism, and Proposed Extended Glycemic Index", Critical Reviews in Food Science and Nutrition, vol. 49, No. 10, Dec. 2, 2009, pp. 852-869.
European Patent Office Communication from the Examining Division and Annex to the Communication; dated Jun. 12, 2019; for European Patent Application No. EP16712260.5 (2 pgs).
Aller, Erik E. J. G., et al: "Starches, Sugars and Obesity"; Nutrients; vol. 3; No. 12; Dec. 14, 2011; pp. 341-369 (12 pgs.).
Desbonnets, P.; "Maltitol New Opportunities for Baking"; International Food Ingredients; No. 2; Jan. 1, 1998; pp. 39-40 (3 pgs.).
Eurpoean Search Report, dated Jun. 17, 2015 for European Application No. 15159038.7 (9 pgs.).
International Search Report and Written Opinion of the International Searching Authority, dated May 30, 2016 for International Application No. PCT/EP2016/055234 (16 pgs.).
Kim, Ji-Na, et al; "Textural and Sensory Characteristics of Rice Chiffon Cake Formulated with Sugar Alcohols Instead of Surcrose"; Journal of Food Quality; vol. 37; No. 4; Jun. 6, 2014; pp. 281-290 (10 pgs.).
Ludewig, H. G., et al.; "Eignung von Zuckeraustauschstoffen fur Biskuitgebacke und Ruhrkuchen" (Suitability of sugar substitutes for biscuits and high ratio cakes); Getreide Mehl Und Brot, Bochum, De; vol. 49; No. 5; Jan. 1, 1995; pp. 309-314 (6 pgs.).
Quilez, Joan, et al.; "Mejora de la respuesta posprandial y del efecto saciante tras el consumo de magdalenas bajas en calorias con maltitol y almidon de maiz alto en amilosa"; Monografico Jornadas Biet; pp. 93-94 (2 pgs.).
Wolever, Thomas M. S., Phd, MD.; T; "Dietary carbohydrate in the management of diabetes: importance of source and amount"; Endocrinology Rounds; vol. 2; Issue 5; May 1, 2002; Retrieved from the Internet: URL:http://www.endocrinologyrounds.ca/crus/endoeng 0502.pdf; retrieved on May 5, 2015 (6 pgs.).
Russian Office Action dated May 17, 2018 for Russian Application No. 2017130851, with English translation (6 pgs.).
Notification of First Office Action dated Mar. 19, 2020, for Chinese Applicatoin No. 201680010830.X, with English Translation (13 pgs.).

* cited by examiner

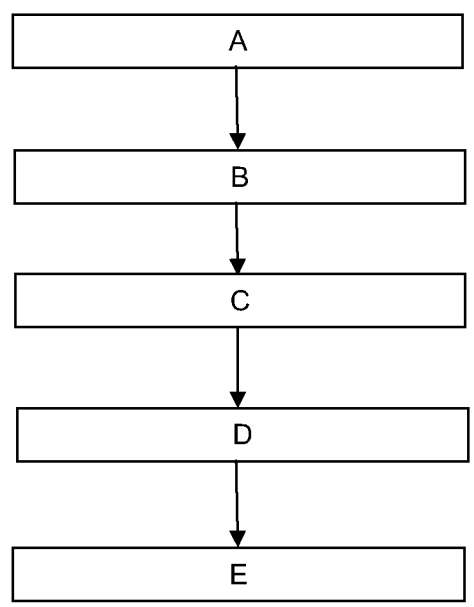

BAKERY PRODUCT

CROSS REFERENCE TO RELATED APPLICATIONS

This application is a U.S. national phase application of International Application No. PCT/EP2016/055234, filed Mar. 11, 2016, which claims benefit from European Application 15159038.7, filed Mar. 13, 2015, which are each hereby incorporated herein by reference in their entirety.

FIELD

The present disclosure relates to bakery products. In particular, the disclosure relates to soft bakery products, such as cakes, having a large amount of slow release carbohydrates.

BACKGROUND

Bakery products that provide a slow release of carbohydrates, and therefore have a long-lasting energy release, are believed to be beneficial for consumers' health. The presence of slowly available glucose (SAG) in these products is responsible for this long-lasting energy release. Bakery products typically comprise more SAG before baking than after baking. The amount of SAG typically decreases during the baking process due to the gelatinisation of the starch during the baking process. The gelatinisation occurs in part because of the presence of water in the dough mixture. Gelatinisation refers to the partial melting of the crystalline domains of starch, resulting in increased digestibility. During the heat treatment of moist dough the starch granules first swell, then progressively lose their crystalline structure until they burst, resulting in the leaching out of the polysaccharides contained in the granules (amylose and amylopectin).

Cakes are well-known examples of soft bakery products and include, for example, brownies, sponges (such as a Victoria sponge cake or Madeira cake) and muffins. US 2013/0177676, for example, discloses a soft cake, such as a brownie-type pastry. U.S. Pat. No. 3,393,074 discloses a solid dessert having the texture of a freshly-baked cake. U.S. Pat. No. 4,350,713 discloses a sponge cake.

In dry products such as biscuits, it may be possible to control the baking conditions and/or the ingredients in order to minimise the amount of SAG that is lost during the baking process. However, preparing products with a soft texture presents technical challenges for the delivery of high levels of SAG. Such technical challenges may be related to the moisture content of the dough or batter (typically much higher than for biscuits), which can result in a breakdown of the native flour and starch matrix during baking and thereby provide a more rapidly digestible starch component. The inventors have therefore sought to provide a bakery product having a desirable, uniformly soft texture, while maintaining the high SAG levels that are possible with dry biscuits.

It is known to use polyols, such as maltitol, to replace sugars in diabetic products. It is also known to include maltitol in products having a conventional sugar content. For example, EP 1712134 discloses a cookie prepared from a dough containing 6-11 wt % maltitol, 15 to 25 wt % sugar and 17-25 wt % added water. The maltitol acts with the sugar in the cookie to enable the cookie to harden rapidly upon cooling. Accordingly, such cookies could not be described as "soft". Moreover, the relationship between maltitol and SAG is not explored in this document.

US2005/058759 relates to protein-enhanced, low-carbohydrate snack foods. The focus, in particular, relates to low-carbohydrate cookies. These contain sugar alcohols as a replacement for sugar and several examples include maltitol. The sugar alcohols are added to improve the texture, moisture content and crystalisation properties of the cookies. These cookies have a low Aw and, at least because of the low levels of starch included, have a level of SAG of less than 15 wt %.

EP0390299 discloses foodstuffs containing maltitol as a sweetener or fat replacement. The maltitol is used as a partial or complete sugar replacement. This document includes two examples of soft bakery products containing maltitol (Examples 6 and 7). These relate to yellow cake products which contain sugar, maltitol and about 25% flour. Such cake products would not have a level of SAG of 15 wt % or more. In particular, the high levels of dough moisture will be conducive to higher level of starch gelatinization with the moderate levels of wheat flour used, the high water content (~30 wt % added water) and the baking conditions (a baking time for 30 minutes at 177° C.), the levels of SAG would be low.

"Textural and sensory characteristics of rice chiffon cake formulated with sugar alcohols instead of sucrose", Kim et al, Journal of Food Quality ISSN 1745-4557, discloses the use of sugar alcohols as a sugar replacer. There is no consideration of the SAG levels and, with the moderate levels of wheat flour used (18.6%) and the baking conditions (a baking time for 40 minutes at 160° C.), the levels of SAG would be low.

"Mjora de la respuesta potprandial y del efecto saciante tras el consumo de magdalenas bajas en calorias con maltitol y almidon de maiz alto en amilosa", Quilez et al, Alimentaria, ISSN: 0300-5755, discloses the use of high levels of maltitol such as 22% as a full replacement for maltitol.

There is a desire for a product that will mitigate at least some of the problems associated with the prior art or at least provide a commercially useful alternative thereto. In particular, there is a desire for a bakery product having a soft texture, together with the high SAG content hitherto associated only with dry biscuit products.

According to a first aspect, the present disclosure provides a soft bakery product having a slowly-available-glucose (SAG) content of at least 15 wt % and a water activity of from 0.4 to 0.9, the product comprising a dough-based, baked portion, and optionally a coating and/or a filling, the product comprising:
  cereals in an amount of at least 35 wt %;
  at least 5 wt % sugars by weight of the soft bakery product; and
  from 0.1 to 15 wt % maltitol by weight of the soft bakery product.

The present disclosure will now be described further. In the following passages different aspects/embodiments of the disclosure are defined in more detail. Each aspect/embodiment so defined may be combined with any other aspect/embodiment or aspects/embodiments unless clearly indicated to the contrary. In particular, any feature indicated as being preferred or advantageous may be combined with any other feature or features indicated as being preferred or advantageous.

The present disclosure relates to a soft bakery product. Soft bakery products are baked, edible, cereal-based products and are well known in the art. Exemplary products include soft cakes, preferably cakes, cupcakes, sponge cakes, soft bars, brownies, but also brioche, croissants, buns, muffins, Swiss rolls, patisserie products such as tarts, plaits, and swirls, pain au chocolat, macaroons, flapjacks, doughnuts, pies, scones, éclairs, Mille-feuille, puddings, flans, tortes, pancakes, profiteroles, bread and bread-like products. The bakery product may be sweet or savoury.

Soft bakery products are characterised by a soft or tender texture. That is, soft bakery products are not crispy or crunchy. Soft bakery products often have an intermediate or high level of water activity (Aw), as discussed below. Conventional biscuits, which typically contain little moisture, have a crispy texture contrasting with that of a soft bakery product.

The bakery product comprises a dough-based, baked portion. A dough is a thick, malleable, paste made out of cereals and water, and is a precursor to forming a baked component of a bakery product. The dough-based, baked portion is, therefore, a baked foodstuff which has been formed by baking a dough comprised of cereals. Such elements are well known components of the exemplary products listed above.

In the event that there is no coating or filling, the soft bakery product consists of the dough-based, baked portion. Preferably the soft bakery product includes a coating and/or a filling. The dough-based, baked portion, such as a cake, typically acts as at least the structural component of the product and may be provided with the coating on at least a section of an outer surface, and/or the filling at least within the dough-based, baked portion. The filling and/or coating may be provided after the dough-based, baked portion is formed (by baking a dough-piece), or one or both may be included with the dough-piece before baking.

The SAG, sugars and maltitol contents disclosed herein are by weight of the entire soft bakery product, including any filling or coating where present, unless otherwise stated.

The present inventors have found that by including even a small amount of maltitol in a soft bakery product, it is possible to significantly increase the SAG content of the product relative to products that lack maltitol. The present disclosure therefore provides a bakery product having a soft texture that is desirable to consumers, while having the high SAG content and associated health benefits that have only been associated with dry biscuits.

Commercially, mass-produced soft bakery products are typically small, and leavened with baking powder, baking soda, or sometimes yeast. They can include fillings and/or coatings. A chocolate doughnut, for example, provides an example of a bakery product having a coating (chocolate) and a filling (often chocolate or cream).

The soft bakery product described herein is preferably a single-portion sized cake-type product. A single portion is one to be consumed in a single sitting by a single person and will typically be individually wrapped.

As noted above, SAG refers to the amount of glucose (principally from starch, including maltodextrins, but also from sugar) likely to be available for slow absorption in the human small intestine. In the context of the present disclosure, the slowly digestible starch ("SDS") content equals the SAG content because there is no other SAG source than starch, i.e. SDS. Rapidly available glucose (RAG) refers to the amount of glucose likely to be available for rapid absorption in the human small intestine.

SAG, as used herein, is defined and measured according to the Englyst method ("Rapidly Available Glucose in Foods: an In Vitro Measurement that Reflects the Glycaemic Response", Englyst et al., Am. J. Clin. Nutr., 1996 (3), 69(3), 448-454; "Glycaemic Index of Cereal Products Explained by Their Content of Rapidly and Slowly Available Glucose", Englyst et al., Br. J. Nutr., 2003(3), 89(3), 329-340; "Measurement of Rapidly Available Glucose (RAG) in Plant Foods: a Potential In Vitro Predictor of the Glycaemic Response", Englyst et al., Br. J. Nutr., 1996(3), 75(3), 327-337).

In Englyst method, bakery samples are prepared by manually and roughly grinding one or more samples. The bakery samples are then subjected to an enzymatic digestion by incubation in presence of invertase, pancreatic alpha-amylase and amyloglucosidase under standardised conditions. Parameters such as pH, temperature (37° C.), viscosity and mechanical mixing are adjusted to mimic the gastrointestinal conditions. After an enzymatic digestion time of 20 min, glucose is measured and is labelled RAG. After an enzymatic digestion time of 120 min, glucose is again measured and is labelled available glucose (AG). SAG is obtained by subtracting RAG to AG (SAG=AG−RAG), thus, SAG corresponds to the glucose fraction released between the $20^{th}$ and the $120^{th}$ minute. Free glucose (FG), including the glucose released from sucrose, is obtained by separate analysis. RDS is then obtained as the subtraction of FG from RAG (RDS=RAG−FG).

SAG content in a baked product may be associated with the presence of ungelatinized starch. During processing of a cereal product, gelatinization of starch reduces the SAG content. Because starch gelatinization substantially increases in the presence of moisture, one established method of increasing SAG in a baked product is to use a minimal amount of water in a cereal product formulation; using lower amounts of water may result in lower levels of starch gelatinization, and therefore higher SAG levels in the finished product. However, a soft bakery product has less cereal than a biscuit, and therefore a smaller potential source of SAG. Moreover, the higher ratio of water to cereals in the dough means that the starch is more susceptible to gelatinization during the baking process. This effect is especially pronounced since soft bakery products are typically thicker than biscuits and require longer baking times, with the high-humidity baking conditions providing good conditions for starch gelatinization. Accordingly, achieving a high SAG content in a soft bakery product, as opposed to a biscuit, is particularly challenging. As will be explained below, it the present inventors have found that the inclusion of maltitol can assist in increasing the SAG levels of soft baked products.

The soft bakery product of the present disclosure has a slowly-available-glucose (SAG) content of at least 15 wt %. Such a product provides a long-lasting energy to the consumer. Preferably, the soft bakery product has a SAG content of from 15 to 40 wt %, more preferably from 15 to 35 wt %, still more preferably from 16 to 30 wt %, and most preferably from 16 to 25 wt %. High SAG levels ensure that the consumer has a long-lasting energy from the product.

The water activity (Aw) of a product is a notion which is well known in the food industry field. This value measures the availability of water in a sample. In most cases, this water activity is not proportional to the water content of the product. Methods for measuring Aw of a product are known to the person skilled in the art. For example, it can be measured with an Aqualab CX-2 or series 3, or a Novasina. All Aw values indicated hereafter are measured at 25±0.1° C. The Aw is measured of the freshly produced and packaged product.

The soft bakery product of the present disclosure has a water activity of from 0.4 to 0.9, preferably from 0.50 to 0.85, more preferably from 0.5 to 0.75, most preferably about 0.6. This water activity defines the product as a whole, including any coating or filling that may be present.

By the term "sugars" is meant simple sugars (degree of polymerisation=1) such as glucose and fructose, as well as disaccharides (degree of polymerisation=2) such as sucrose and maltose. The term "sugars" as used herein does not include "oligosaccharides", which are digestible carbohydrates having a degree of polymerisation of 3 or above. The product of the present disclosure can be sweet-tasting and the sugar content is conventional for a soft bakery product. The product is to be contrasted with diabetic products, which typically contain significantly less than 5 wt % sugars.

The soft bakery product of the present disclosure comprises at least 5 wt % sugars. Preferably, the soft bakery product comprises from 5 to 30 wt % sugars, more preferably from 10 to 25 wt % and most preferably from 15 to 20 wt %.

Maltitol is a sugar alcohol (a polyol) typically used as a sugar substitute in diabetic and other low-sugar products. It has 75-90% of the sweetness of sucrose (table sugar) and nearly identical properties, except for browning. It is used to replace table sugar because it is half as caloric, does not promote tooth decay, and has a somewhat lesser effect on blood glucose. In chemical terms, maltitol is known as 4-O-α-glucopyranosyl-D-sorbitol. Advantageously, the inclusion of maltitol allows for tasty product having excellent texture (since sugars are still present) and which nevertheless provides the health benefits associated with a high SAG content.

The soft bakery product of the present disclosure comprises from 0.1 to 15 wt % maltitol. Preferably, the soft bakery product comprises 0.5 to 12 wt % maltitol, more preferably from 0.5 to 8 wt %, still more preferably from 1 to 4 wt %, and most preferably from 1 to 2 wt %. Surprisingly, it has been found that even small quantities of maltitol significantly increase the SAG content of the soft bakery product.

The maltitol is present in the dough-based, baked portion and/or the optional coating and/or the optional filling. Preferably the maltitol is predominantly (i.e. at least 50 wt % of the maltitol) in the dough-based, baked portion. More preferably the at least 75 wt % of the maltitol is in the dough-based, baked portion, more preferably at least 90 wt % and most preferably substantially all, or all, of the maltitol is in the dough-based, baked portion of the soft bakery product.

Surprisingly and unexpectedly, the present inventors have found that for a soft baked product having a given starch content, the inclusion of even relatively low amounts of maltitol (0.1 to 15 wt %) affords a significantly higher SAG content compared with a soft baked product that lacks maltitol altogether. Thus, the present inventors have found a way of increasing SAG content without having to decrease dough moisture and therefore without compromising the soft texture of the product. It is surprising that including maltitol could increase SAG for a given starch content, given that maltitol is a non-starchy component. Moreover, the inventors have found that the benefits are not exhibited by other polyols.

Preferably, the soft bakery product has a weight ratio of sugars to maltitol of from 1:1 to 30:1, more preferably from 2:1 to 20:1, still more preferably from 2:1 to 10:1, and most preferably from 4:1 to 8:1. Maltitol is only required in relatively small amounts to increase the SAG of the product, while maintaining a conventional level of sugars. The sugars to maltitol ratio is thus relatively high. This contrasts with diabetic products, in which polyols are used to replace sugars and which therefore have a very low sugars:maltitol ratio.

The mechanism of action of the maltitol remains unknown. However, without wishing to be bound by theory, it is believed that maltitol may delay starch gelatinisation during high temperature processing, such as the baking process.

Preferably, the soft bakery product further comprises glycerol and/or sorbitol. Glycerol and sorbitol are both examples of humectants. Humectants are known in the art and serve to increase the water activity in a product without a concomitant increase in water content. Glycerol (also known as glycerine) is used to increase the softness of the product, and thus provide a desirable texture. Glycerol is especially preferred, since it is a liquid and is especially effective at increasing product softness.

Preferably, the total amount of maltitol, glycerol and sorbitol does not exceed 15 wt %. The total amount of maltitol, glycerol and sorbitol is most preferably from 4 to 10 wt %. It has been found that these quantities lead to an optimal texture, while maintaining high levels of SAG in the product.

Preferably the soft bakery product has a weight ratio of maltitol to glycerol of from 1:20 to 20:1, more preferably from 10:1 to 1:10, and most preferably from 5:1 to 1:5. The weight ratio of maltitol to glycerol is most preferably about 1:1. Higher levels of maltitol serve to increase SAG in the product, but contribute less than the glycerol to the soft texture. By contrast, glycerol is an effective softening agent but does not contribute to the SAG. It is therefore beneficial to have an appropriate balance between these two components.

Preferably, the soft bakery product has a shelf life of at least 3 months at 20° C., more preferably at least 6 months, still more preferably at least 9 months.

Preferably, the soft bakery product comprises cereals in an amount of at least 35 wt %, more preferably at least 40 wt %, and preferably at most 80%. The cereals may be provided by flour and/or inclusions.

Suitable flour may include refined flour and/or whole grain flour. In some embodiments, suitable flour may include thermally treated flour. Wholegrain flour is understood to mean flour produced directly or indirectly from cereal whole grains comprising endosperm, bran and germ. Wholegrain flour may also be reconstituted from separate flours made from endosperm, bran and germ respectively in ratios that give the reconstituted wholegrain flour the same composition as wholegrain flour directly produced from grains that still retain bran and germ. Refined flour is understood to mean flour produced from cereal endosperm only.

Preferably, the soft bakery product comprises at least 5 wt % wholegrain cereals, more preferably at least 10 wt %, and most preferably at least 15 wt %. Preferably, the soft bakery product comprises at most 25 wt % wholegrain cereals. At least a portion of the wholegrain cereals may be provided by wholegrain cereal flour. Suitable types of wholegrain flours may include but are not limited to wholegrain wheat flour, wholegrain barley flour, wholegrain rye flour, wholegrain spelt flour, wholegrain buckwheat flour, wholegrain oat flour, wholegrain rice flour, wholegrain maize flour, wholegrain millet flour, wholegrain kamut flour, wholegrain sorghum flour, wholegrain teff flour, wholegrain triticale flour, and pseudocereal flour such as amaranth flour and *quinoa* flour, and mixtures thereof. Other sources of wholegrain cereals include wholegrain semolina and wholegrain cereal inclusions.

Preferably, the soft bakery product comprises inclusions. An inclusion is understood to be a component of the soft bakery product that does not become part of the gluten or dough matrix, and may be visually distinguishable as an entity in a soft bakery product. Preferably, the inclusions are selected from the group consisting of flakes, groats, grits, cuts and mixtures of two or more thereof. Such ingredients may serve to trap moisture. Such inclusions may be sourced from various cereals or pseudocereals, for example, wheat, oat, corn, rye, barley, spelt, millet, sorghum, kamut, triticale, buckwheat, *quinoa*, and/or amaranth. The inclusion may be a whole grain cereal inclusion.

A complete list of cereal and pseudocereal flours can be found in the definition of "whole grains" based on AACC International Whole Grain Task Force. See AACC International www.aacc.net.org/definitions/wholegrain, which is incorporated by reference herein in its entirety. The definition states that, "Cereals are generally considered to be the seed heads of grasses from the Poaceae (synonymous with Gramineous) family. Pseudocereals are seed heads of a number of different species of plants that do not belong to the grass family and do not include legumes or oilseeds. The Task Force decided that the pseudocereals should be included with the cereals because the grain heads of pseudocereals are used in the same traditional ways that cereals are used, such as in the making of bread, starch staples and side dishes. In addition, the overall macronutrient composition (proportions of carbohydrate, protein and fat) of cereals and pseudocereals is similar."

Flakes may be formed from any suitable grain, including wheat, rye, buckwheat, oats, barley, spelt, triticale, teff, millet, sorghum, *quinoa*, amaranth, kamut, durum wheat and combinations thereof or from any suitable legume such as garbanzo bean flakes or corn tapioca or sago flakes. The process of preparing flakes and specific processing conditions may depend on the botanical origin of flakes. Some flakes such as rye or barley or wheat may be understood to mean grains that are hydrated and/or steamed and/or heated, and rolled and thereby flattened into a grain flake. The flakes may consist of entire grain berries, such as whole oat flakes, medium oat flakes, quick cooking oats, or can be milled further to reduce their size.

Groats, grits and cuts may be formed from any suitable grain or seed, including oats, buckwheat, *quinoa*, amaranth, millet, wheat, barley, spelt, kamut, triticale, sorghum, corn, rye or combinations thereof.

The soft bakery product may further comprise non-starchy inclusions such as fruit, legumes, chocolate chips, nougat, caramel inclusions, crisps (protein, rice, etc.), any other suitable inclusion, or combinations thereof. Suitable fruit inclusions may include but are not limited to blueberries, strawberries, raspberries, bananas, peaches, raisins, cranberries and the like. These inclusions may provide textural, aesthetic, as well as nutritional benefits.

Preferably, the soft bakery product comprises fat, wherein the fat provides at most 45% of the total energy provided by the soft bakery product, preferably less than 40%, more preferably less than 35%, and preferably at least 10%. Fat may be added to the cereal product from any suitable source, including but not limited to shortenings and oils. In some embodiments, a cereal product includes canola oil, high oleic canola oil, palm oil, soybean oil, sunflower oil, sufflower oil, cottonseed oil, hydrogenated oils, transesterified oils or combinations of thereof. The choice of the oil may depend on desired textural and nutritional properties of the cereal product.

Coatings and fillings are well known in the art. Exemplary coatings include chocolate or chocolate-like coatings and may be provided with a soft texture, or a contrasting crunchy or chewy texture, to provide an improved organoleptic product. Fillings include jams, creams and pastes, such as chocolate ganache. A filling composition is one which has a desirable flavour and mouth feel. Such fillings typically include fat, sugar, starchy ingredients such as starches, modified starches, flours, inclusions, and a flavouring, such as a chocolate, hazelnut, coffee, strawberry, mint or vanilla flavouring.

It can also be a savoury filling, with for instance, tomato or cheese powders and flavours. The maltitol described herein may be included in the coating and or filling, if these are present.

Preferably the soft bakery product has a moisture level of 5 to 20 wt %, preferably 7 to 18 wt %, and more preferably 8 to 16 wt % by weight of the soft bakery product. Such levels of moisture contribute to the softness of the product.

According to a second aspect, the present disclosure provides a method of producing a soft bakery product as disclosed herein. The method comprises:
(i) forming a dough piece; and
(ii) baking the dough piece in an oven to form the soft bakery product.

As will be appreciated, while these steps are intended to be sequential, there may be some overlap between the steps when the process is carried out in a continuous manner.

The dough preferably contains less than 15 wt % added water, preferably less than 10 wt % added water. The low levels of added water help to reduce gelatinisation of starch during baking.

The method may include providing a filling and/or a coating. The filling and/or coating may be provided after the dough piece is baked, or one or both may be included with the dough piece before baking.

Preferably, the method further comprises packaging the soft bakery product.

BRIEF DESCRIPTION OF THE FIGURE

The present disclosure will be described in relation to the following non-limiting FIGURES, in which:

FIG. 1 is a flow chart of the steps in accordance with the method disclosed herein.

In particular, FIG. 1 shows Step A of forming a dough piece; Step C of baking the dough piece in an oven to form a soft bakery product in accordance with the present disclosure; optional Steps B and D of applying a filling and/or a coating, and optional Step E of packaging the soft bakery product.

DETAILED DESCRIPTION

Embodiments without a coating and/or filling will now be described in relation to the following non-limiting examples.

Example 1

In this example the effect of different polyols on SAG content was investigated. Soft products were prepared in accordance with the following dough recipes:

| Ingedients (%/dough) | Control | A | B | C | D | E |
|---|---|---|---|---|---|---|
| Flours & Cereals | 46.9 | 46.9 | 46.9 | 46.9 | 46.9 | 46.9 |
| Fat | 10.7 | 10.7 | 10.7 | 10.7 | 10.7 | 10.7 |
| Fibers | 5.1 | 5.1 | 5.1 | 5.1 | 5.1 | 5.1 |

-continued

| Ingredients (%/dough) | Control | A | B | C | D | E |
|---|---|---|---|---|---|---|
| Sugars | 16.6 | 16.6 | 16.6 | 16.6 | 16.6 | 16.6 |
| Water | 8.8 | 8.8 | 8.8 | 8.8 | 8.8 | 8.8 |
| Others | 7.5 | 7.5 | 7.5 | 7.5 | 7.5 | 7.5 |
| Glycerin | 4.48 | 2.24 | 2.24 | 2.24 | 2.24 | 2.24 |
| Sucrose | | 2.24 | | | | |
| Isomalt | | | 2.24 | | | |
| Xylitol | | | | 2.24 | | |
| Lactitol | | | | | 2.24 | |
| Maltitol | | | | | | 2.24 |
| | 100.0 | 100.0 | 100.0 | 100.0 | 100.0 | 100.0 |

The polyols tested were introduced in substitution of 50% of the glycerin present in the control recipe. Level of polyols (isomalt, xylitol, lactitol, maltitol) were the same for all the recipes. Lactitol is structurally similar to maltitol and has the same molecular weight.

The flours and cereal in these examples provides the source of the starch in the soft product. After baking, the ungelatinized starch constitutes the SAG.

The dough is prepared by mixing all the ingredients in a planetary mixer using the following sequence.

| | Speed | Time (min) |
|---|---|---|
| 1/Liquids | 1 | 1 |
| 2/Powders | 2 | 2 |
| 3/Cereals | 1 | 1 |
| 4/Inclusions | 1 | 1 |

After a resting time of at least 30 min the dough was formed using a wire cut equipment. Pieces of 50 g were then produced and baked 8 min 30 sec at 170° C.

The Aw of the baked products were as follows:

| | Control | A | B | C | D | E |
|---|---|---|---|---|---|---|
| Aw | 0.600 | 0.605 | 0.592 | 0.594 | 0.586 | 0.600 |

The SDS of the baked products were as follows:

| | Control | A | B | C | D | E |
|---|---|---|---|---|---|---|
| SDS (g/100 g) | 15.0 | 17.5 | 16.9 | 15.8 | 17.0 | 20.5 |

When replacing half of glycerin by sucrose, it was found that the SDS increased by 2.5 points. This increase may be because of:
- The increase of sucrose level which will delay starch gelatinization (this is well documented in the literature)
- The decrease of glycerin which acts as a plasticizer and may then reduce molecules' mobility; and then reduce or delay starch gelatinization and enzyme activity.

It is clear that isomalt, xylitol and lactitol show lower effect than sucrose on SDS of the soft product. Surprisingly the use of maltitol lead to an increase of SDS by 3 points compared to sucrose and by 5.5 points, compared to the control.

It should be noted that lactitol and maltitol have the same chemical formula and molecular weight. Nevertheless the impact on the SDS of the finished product is different.

Example 2

This Example demonstrates the impact of maltitol in intermediate-Aw-content baked goods.

Products were prepared following the recipes A and B:

| | A | B |
|---|---|---|
| Cereals | 39.9 | 39.5 |
| Fat | 8.7 | 8.6 |
| Glycerin | 5.5 | 5.5 |
| Sugar | 14.8 | 14.6 |
| Eggs | 11.9 | 10.2 |
| Others | 16.5 | 17.7 |
| Maltitol | 2.7 | 0.0 |
| Sorbitol | 0.0 | 3.9 |
| | 100.0 | 100.0 |

The cereals in these examples provides the source of the starch in the soft product. After baking, the ungelatinized starch from these products constitutes the SAG.

The levels of polyols (dry matter) were similar in both recipes, since liquid sorbitol contains 70% of polyols.

The SDS content of the finished products are analysed by the Englyst method. The results are shown in the following table.

| | A | B |
|---|---|---|
| SDS (g/100 g) | 17.0 | 12.7 |

Aw of recipe A: 0.74
AW of recipe B: 0.72.

The SDS content of product A (which contained maltitol) was clearly significantly higher than that of product B (which contained sorbitol).

Example 3

In this example the impact of maltitol dosage level was investigated.

The control recipe is given in the following table:

| Ingredients | %/dough |
|---|---|
| Flours & Cereals | 50.2 |
| Fat | 9.3 |
| Glycerin | 6.5 |
| Fiber | 5.1 |
| Sugars | 14.7 |
| Water | 7.0 |
| Others | 7.1 |
| | 100.0 |

The flours and cereal in these examples provides the source of the starch in the soft product. After baking, the ungelatinized starch from these products constitutes the SAG.

Different levels of maltitol were introduced in the recipe. In order to keep the level of disaccharides equal, maltitol was used in substitution of the glycerol present in the recipe.

The dough was prepared by mixing all the ingredients in a planetary mixer using the following sequence.

|  | Speed | Time (min) |
|---|---|---|
| 1/Liquids | 1 | 1 |
| 2/Powders | 2 | 2 |
| 3/Cereals | 1 | 1 |
| 4/Inclusions | 1 | 1 |

After a lay time of at least 30 min the dough was formed using a wire cut equipment. 50 gram pieces were then produced and baked.

The SDS content of the finished products are analysed by the Englyst method.

The SDS contents at given maltitol concentrations are shown in the following table:

| % Maltitol related to the total weight of the dough | SAG (%) |
|---|---|
| 0 | 15.3 |
| 1.62 | 19.3 |
| 3.24 | 22.7 |
| 4.84 | 25.6 |

As demonstrated, the higher the level of maltitol used, the higher the SDS level in the product.

The foregoing detailed description has been provided by way of explanation and illustration, and is not intended to limit the scope of the appended claims. Many variations in the presently preferred embodiments illustrated herein will be apparent to one of ordinary skill in the art, and remain within the scope of the appended claims and their equivalents

The invention claimed is:

1. A soft bakery product comprising a cake and optionally a coating and/or a filling, the product comprising:
   cereals in an amount of at least 35 wt %;
   at least 5 wt % sugars, having a degree of polymerisation of 1 or 2;
   from 0.1 to 4 wt % maltitol; and
   a moisture level of 5 to 20 wt %; wherein all wt % are percentages by weight of the soft bakery product; and
   wherein the soft bakery product has a weight ratio of sugars to maltitol of from 2:1 to 20:1, a slowly-available-glucose (SAG) content of from 16 to 30 wt %, and a water activity of from 0.4 to 0.9.

2. A soft bakery product according to claim 1, wherein the maltitol is present in the cake.

3. A soft bakery product according to claim 1, wherein the soft bakery product has a shelf life of at least 3 months at 20° C.

4. A soft bakery product according to claim 1, wherein the soft bakery product comprises from 5 to 30 wt % sugars.

5. A soft bakery product according to claim 1, wherein the soft bakery product comprises cereals in an amount of at least 40 wt %.

6. A soft bakery product according to claim 1, wherein the soft bakery product comprises a filling and/or a coating.

7. A soft bakery product according to claim 1, wherein the soft bakery product has a moisture level of 7 to 18 wt % by weight of the soft bakery product.

8. A method of producing a soft bakery product according to claim 1, the method comprising:
   (i) forming a dough piece by mixing dough ingredients, wherein the dough ingredients include added water, wherein forming the dough piece includes adding water; and
   (ii) baking the dough piece in an oven to form the soft bakery product.

9. A method according to claim 8, wherein the dough piece contains less than % 15 wt % added water.

10. A method according to claim 8, wherein the method further comprises packaging the soft bakery product.

11. A soft bakery product according to claim 2, wherein the maltitol is not present in the optional coating and/or the optional filling.

12. A soft bakery product according to claim 7, wherein the soft bakery product has a moisture level of 8 to 16 wt % by weight of the soft bakery product.

13. A method according to claim 9, wherein the dough piece contains less than % 10 wt % added water.

* * * * *